United States Patent [19]
Hawkins et al.

[11] Patent Number: 5,976,419
[45] Date of Patent: Nov. 2, 1999

[54] METHOD FOR APPLYING A COATING THAT ACTS AS AN ELECTROLYTIC BARRIER AND A CATHODIC CORROSION PREVENTION SYSTEM

[75] Inventors: Todd R. Hawkins, Massillon; Steven R. Geer, Tallmadge, both of Ohio

[73] Assignee: Geotech Chemical Company, Tallmadge, Ohio

[21] Appl. No.: 09/094,092

[22] Filed: Jun. 9, 1998

[51] Int. Cl.[6] .............................. H01B 1/00; H01B 1/02; B05D 3/00
[52] U.S. Cl. .......................... 252/512; 252/513; 427/180; 427/327; 427/384
[58] Field of Search .................................. 252/500, 512, 252/513; 427/180, 327, 384

[56] References Cited

U.S. PATENT DOCUMENTS

| | | | |
|---|---|---|---|
| 3,546,155 | 12/1970 | Chandler | 260/37 |
| 3,748,172 | 7/1973 | Speirs | 117/135.1 |
| 3,862,851 | 1/1975 | Speirs et al. | 117/70 |
| 4,086,153 | 4/1978 | Ariga et al. | 204/181 |
| 4,130,469 | 12/1978 | McGinnies | 204/159.16 |
| 4,140,816 | 2/1979 | McGinnies | 427/44 |
| 5,853,621 | 12/1998 | Miller et al. | 252/500 |
| 5,871,671 | 2/1999 | Kinlen et al. | 252/500 |

*Primary Examiner*—Yogendra Gupta
*Assistant Examiner*—Brian P. Mruk
*Attorney, Agent, or Firm*—Emerson & Associates; Roger D. Emerson; Marcella R. Louke

[57] ABSTRACT

A method of coating ferrous and nonferrous metal substrates that provides cathodic protection from corrosion by coating with inherently conductive polymers and sacrificial anodic metal particles. This method of coating is characterized by its conductivity and cathodic corrosion resistant qualities.

20 Claims, 1 Drawing Sheet

Cathodic Coating Utilizing Inherently Conductive Polymers

METHOD FOR APPLYING A COATING THAT ACTS AS AN ELECTROLYTIC BARRIER AND A CATHODIC CORROSION PREVENTION SYSTEM

BACKGROUND OF THE INVENTION

1. Field of Invention

This invention pertains to a corrosion prevention system and method of producing the same, and more specifically to a system for protecting a metal substrate from corrosion utilizing a cathodic coating comprising at least one inherently conductive polymer and sacrificial metal particles.

2. Description of the Related Art

One type of coating used to protect metals from corrosion is called a barrier coating. Barrier coatings function to separate the metal from the surrounding environment. Some examples of barrier coatings include paints and nickel and chrome plating. An effective barrier coating includes a layer of the conductive polymer polyaniline. However, as with all barrier coatings, holidays in the barrier coatings leave the metal substrate susceptible to corrosion. Electrochemically active barrier coatings, such as nickel, chrome, and conductive polyaniline layers, can actually accelerate corrosion of underlying metals at holidays in the coating.

Another type of coating used to protect metal substrates are call sacrificial coatings. The metal substrate is coated with a material that reacts with the environment and is consumed in preference to the substrate it protects. These coatings may be further subdivided into chemically reactive, e.g., chromate coatings, and electrochemically active, or galvanically active, e.g., aluminum, cadmium, magnesium, and zinc. The galvanically active coatings must be conductive and are commonly called cathodic protection.

In the art, a major difficulty has been the creation of a coating that protects like a cathodic system but is applied with the ease of a typical barrier coating system. Furthermore, there are many environmental drawbacks with both traditional barrier and sacrificial methods, from use of high levels of volatile organic compounds to expensive treatment of waste waters produced by plating and subsequent surface preparation for top-coating processes.

The present invention contemplates a new and improved coating system and method of producing the same which overcomes the foregoing difficulties and others while providing better and more advantageous overall results.

SUMMARY OF THE INVENTION

In accordance with the present invention, a new and improved cathodic corrosion resistant coating system is provided which may be easily applied in an environmentally friendly, efficient, safe and cost effective way to a metal substrate.

More particularly, the coating system utilizes at least one inherently conductive polymer in combination with galvanically anodic metals dispersed in a resin matrix and applied to a metal substrate to create a cathodic coating which is corrosion resistant.

In accordance with the invention, a coating composition is provided for use in protecting metallic substrates from corrosion comprising at least one inherently conductive polymer and metal particles anodic to the substrate dispersed in a resin base.

According to another aspect of the invention, a method of protecting a metallic substrate from corrosion is provided including the steps of preparing a surface of the substrate; coating the prepared surface with a coating composition comprising an inherently conductive polymer and metal particles anodic to the substrate dispersed in a resin base; and, curing the coating composition to form a corrosion resistant coating.

According to another aspect of the invention, a method of preparing a coating composition is provided including the steps of dispersing at least one inherently conductive polymer and metal particles anodic to the intended substrate in a resin base material.

According to yet another aspect of the invention, the coating composition may be a high solids formulation.

According to yet another aspect of the invention, the coating composition may be a UV curable formulation.

According to yet another aspect of the invention, the coating composition may be a powder coating formulation.

One advantage of the present invention is that the claimed coating can utilize most conventional methods for application, including dipping, brushing, rolling, spraying, fluidized bed, electrostatic powder, and thermally sprayed powder.

Another advantage of the present invention is the reduction or elimination of the emission of volatile organic compounds into the atmosphere.

Another advantage is the elimination of the rinsing processes associated with galvanizing and plating operations, surface preparation for top-coating, and subsequent waste water treatment.

Another advantage is the reduction of the levels of zinc, lead, cadmium, and other heavy metals in water systems and soil due to weathering of galvanized and plated structures.

Another advantage of the present invention is the cost effectiveness of the process. The coating may be produced at a reasonable cost and applied with existing application systems. Use of the inventive coating system will extend service life and reduce the costs associated with corrosion maintenance.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
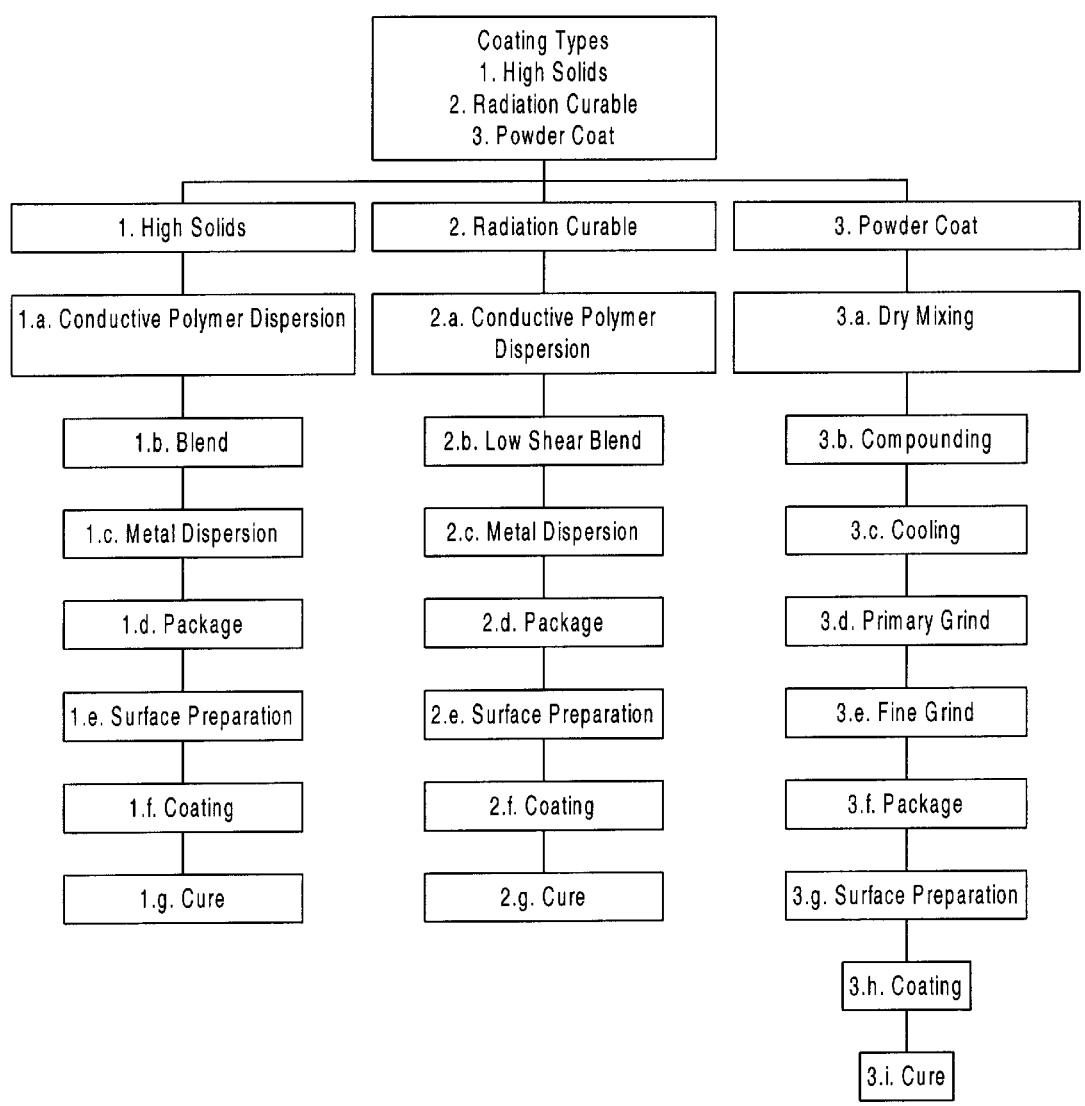
FIG. 1 shows a process flow chart for producing three types of cathodic coatings according to the invention.

The present invention concerns a cathodic coating for ferrous or nonferrous metal substrates. Generally, the coating system utilizes inherently conductive polymers and metal particles anodic to the metallic substrate dispersed in a coating matrix. It has been found that the coating system disclosed herein provides unexpected and significantly improved corrosion protection by forming an adherent, electrochemically active, and truly cathodic protective coating.

The inventive coating system effectively creates an electron path by the thorough dispersion of one or more conductive polymers and metal particles which eliminates dielectric barriers associated with other organic systems, thus creating a protective galvanic corrosion cell.

The present invention is directed to coating systems utilizing at least one inherently conductive polymer and metal particles anodic to the substrate dispersed in a resin base. The coating systems of the present invention may be formulated as high solids systems, radiation curable systems, and powder coat systems.

For the purposes of the present invention, "High Solids" means an ambient temperature curable coating that complies with the Los Angeles County Rule 66 definition, i.e. 80% non-volatiles by volume or greater. "Radiation Curable" involves the polymerization and crosslinking of functional monomers and oligomers (usually liquid, can be a powder) into a crosslinked polymer network (usually a solid film) induced by photons (UV curing) or electrons (EB curing). The curing can occur by either free radical or cationic polymerization. Infrared and beta radiation can also be utilized as energy sources for some radiation cure processes. "Powder Coating" involves coating objects with electrostatically sprayed, thermally sprayed, or fluidized polymer powder under influence of thermal energy causing the fine powder to melt or crosslink around the object and upon cooling to produce a compact polymeric layer. The process steps and equipment to produce the coatings of the present invention are described below.

In general, the preferred conductive polymer for use in each of the systems is polyaniline. Aluminum is the preferred anodic metal particulate, however, any anodic metal that creates sufficient potential difference from the metal substrate may be used according to the invention. Preferably, at least a 0.02 volt potential difference is established. In the preferred embodiment, the coating should produce a polarize cathode surface of −0.85 volts or more electronegative potential when measured using a copper—copper sulfate electrode place close to the electrolyte/structure interface. This measurement is actually a measurement of voltage drop at the interface of the metallic substrate surface and the electrolyte with the reference cell being one contact terminal and the metal surface being the other terminal.

General formulations for the coating systems according the invention are set forth as follows:

A. Resin Base:
 1. High Solid Coatings
  a. Polyurethane
  b. Epoxy
  c. Neutral or acidic pH resins
 2. UV Radiation Curable
  a. Acrylates
  b. Polyurethane
  c. Epoxy
  d. Polyester
 3. Powder Coat
  a. Epoxy
  b. Polyurethane
  c. Polyester
  d. Glycidyl acrylate
  f. Hybrids or resin blends, i.e. polyester and epoxy
B. Inherently Conductive Polymers
 1. Polyaniline
 2. Polypyrrole
 3. Polythiopene
 4. Polyacetylene
 5. Poly (p-phenylene)
 6. Poly (p-phenylene vinylene)
 7. Poly (p-phenylene sulfide)
 8. Polyaniline substituted with alkyl, aryl, hydroxy, alkoxy, chloro, bromo, or nitro groups
C. Anodic Metal Particles
 1. Aluminum
 2. Cadmium
 3. Magnesium
 4. Zinc
 5. Alloys of the above metals
D. Plasticizers
 1. Sulfonamide
 2. Phosphate Ester types
E. Curing Agents
 1. Sulfonamide
 2. Anhydride types
 3. Photoinitiators
  a. free radical types
  b. cationic types
F. Other Additives
 1. Surfactants
 2. Catalysts
 3. Adhesion Promoters
 4. Solvent With reference to FIG. 1, a process flow chart describing each type of coating system is provided. The following examples of each of the systems show how the instant invention may be practiced, but should not be construed as limiting the invention. The general process is described with exemplary materials in parentheses.

High Solids System

The process steps for making and applying an exemplary high solid system are shown in FIG. 1, steps 1.a. through 1.g.

The process for making the coating is outlined in steps 1.a. through 1.c. Any suitable multi-agitator mixer may be utilized for the blending, dispersion, and grinding operations.

The conductive polymer (polyaniline powder) is dispersed in a quantity sufficient to achieve the desired potential along with a plasticizer (sulfonamide) into a (polyurethane) resin base. The dispersion is high shear mixed for approximately 30 to 45 minutes at a process temperature of from approximately 70° to 150° F.

Any remaining additives and solvent (not to exceed about 15% by weight), are added to the dispersion and blended for additional time, while maintaining the process temperature. If a two-part coating system is desired, the catalyst should not be added to this mixture until just prior to application of the coating.

The metal, in the form of finely divided particles (aluminum powder or flake), is added to the mixture in a quantity sufficient to achieve the desired potential. Preferably, pure low oxidation aluminum flake or aluminum powder atomized and quenched in an inert environment is used. The aluminum can also be coated with stearic acid to preserve the deoxidized surface. Disperse and grind this mixture further utilizing the same equipment as the previous steps. Grind and disperse for additional 45 minutes or until desired fineness of grind is achieved while maintaining the process temperature below 150° F.

Step 1.d. is a packaging step. Any suitable polypropylene or plastic container can be utilized as packaging. The high solid coating mixture can be discharged directly from the mixing vessel into the packaging container. If a two part system is used, Parts A and B would be packaged separately using methods known in the art.

Surface preparation of the substrate is outlined in step 1.e. A blast cabinet or similar means may be utilized for mechanical surface preparation. Alternately, other methods of surface preparation, including chemical means such as deoxidizing baths, may be utilized. The preferred method comprises lightly blasting the substrate with aluminum oxide grit. The prepared surface should be coated as soon as possible.

Step 1.f. outlines the application of the coating to the substrate. The high solids system is suitable for various methods of applications that are well known and practiced in the art. The coating should be thoroughly mixed prior to application by stirring or shaking. Also, the catalyst should be added at this time if a two part coating is used. The coating can be applied by dipping, brushing, rolling, or spraying. Coating should be applied uniformly to all surfaces to be coated to a wet coat thickness sufficient to achieve a wet film thickness of 2 to 10 mils.

Step 1.g. is a curing step. Curing can be accomplished by allowing the coated item to stand 24 to 72 hours at room temperature to achieve cure. This process may be accelerated by curing in a thermal oven at 150° F. for 1 to 4 hours.

Radiation Curable System

The process steps for an exemplary radiation curable system are shown in FIG. 1, steps 2.a. through 2.g.

The process for making the coating is outlined in steps 1.a. through 1.c. The conductive polymer (polyaniline) is dispersed in a quantity sufficient to achieve desired potential along with a plasticizer (sulfonamide) into the resin base (polyurethane). The dispersion is accomplished by adding components to mixer, blender, attritor, or multi-agitator mixer and high shear mixing for roughly 15 to 30 minutes, maintaining a process temperature of 100° to 140° F.

Any remaining monomers, oligomers, additives, and photoinitiators are added to the polyaniline dispersion and low shear blended for an additional 15 to 30 minutes while maintaining a process temperature below 140° F.

The metal particles (aluminum flake or powder) are then added to the mixture in a quantity sufficient to achieve desired potential. Preferably, pure low oxidation aluminum flake or aluminum powder atomized and quenched in an inert environment is used. The aluminum can also be coated with stearic acid to preserve the deoxidized surface. Disperse and grind this mixture further utilizing the same equipment as in the previous steps. Grind and disperse an additional 30 to 45 minutes or until desired fineness of grind is achieved.

Step 2.d. is a packaging step. Because this coating system is UV curable, the packaging container must be opaque. Any plastic or polypropylene container that blocks ultraviolet light is suitable for packaging this material.

Step 2.e. is the surface preparation step. Again, as with the high solids system, any suitable means of preparing the substrate surface for coating may be utilized.

Step 2.f. is the application of the coating to the prepared substrate. The coating should be thoroughly mixed prior to coating by stirring or shaking. The coating may be applied by means such as dipping, brushing, rolling, spraying, or others already known in the art. Preferably, the coating is applied uniformly to all surfaces to a wet film thickness of 2–8 mils, which will correspond to an equivalent dry film thickness.

Step 2.g. is a curing step. The coating may be cured by exposure to ultraviolet light, beta radiation, electron beam, or in some instances infrared light. One source of UV radiation suitable for curing these coatings produces UV light in the 250 to 500 nanometer wavelength ranges, at a power of 300 watts/inch.

Powder Coat System

In FIG. 1, steps 3.a. through 3.i., the process steps required to produce a cathodic powder coating according to the invention are outlined.

Step 3.a. is a dry mixing operation that can be accomplished in a blender. The preferred method of mixing is utilizing a vertical blender for dry mixing powders. In this step, a premix is made of the powdered resin base, conductive polymer powder (polyaniline powder), plasticizer (sulfonamide), curing agents, additives, and metal particles (aluminum flake or powder). The conductive polymer and metal particles should be added in a quantity consistent with desired electrical potential. This step may be carried out utilizing high shear mixers or low shear mixers, such as ribbon cutters or tumble blenders. Mix for approximately 1 hour or until thoroughly mixed. The mixing preferably occurs at ambient temperatures. It is important that the process temperature does not exceed the cure temperature for the selected resin system.

Step 3.b. is a melt compounding and extruding process which is preferably accomplished in a reciprocating extruder. Melt compounding assures that all the additives, conductive polymer and metal particles are thoroughly dispersed in the molten resin base. Single screw reciprocating extruders are suitable for accomplishing this step. In the case of thermosetting coatings the temperature should be maintained 20°–50° F. above the melting point of the resin, but kept below 400° F. to avoid deteriorating the polyaniline.

In step 3.c. the melt is subjected to a cooling and flattening operation. The extrudate is cooled and flattened into a sheet about 0.005 inch thick by passing it through chilled nip rolls and cooled on an air or water cooling belt.

Step 3.d. is a primary grind operation preferably performed by a crusher at the end of a cooling line. The cooled, compounded sheet is quite friable and readily broken into chips measuring about 0.003–0.005 inches.

Step 3.e. is a fine grinding operation performed in a cryogenic mixing and grinding vessel. The cryogenic grinding serves three purposes. It allows the processing of low cure temperature thermoset powders, it promotes fracture of the aluminum, and it reduces oxidation of aluminum in the coating. The chips should be ground until a desired screen mesh is achieved. Typical mesh size is from +325 to −400.

Step 3.f. is a packaging step. Any suitable plastic bag or polypropylene container that seals the powder from moisture is acceptable. The finely ground powder coating may be discharged directly from the grinding vessel into the packaging container.

Step 3.g. is the process of surface preparation of the substrate. Mechanical means, such as a blast cabinet may be utilized. Additionally, any suitable means for surface preparation may be utilized.

Step 3.h. is the coating application step. The powder coating according to the invention may be applied using an electrostatic spray system, or other application means known in the art. If the powder coating is applied by thermal spraying, the substrate is usually preheated to a temperature slightly above the melting point of the powder.

Step 3.i. is the curing step. Cathodic thermoset powder coating systems are typically cured in thermal ovens. Curing temperatures below 400° F. should be used to prevent deterioration of the polyaniline in the powder. Cure is generally accomplished in 10 to 30 minutes. Cathodic thermoplastic powder coating systems that are thermally sprayed are allowed to cure utilizing residual heat produced by the thermal spray and preheated substrate.

Typical formulations for the coating systems according to the present invention are presented below. The following examples are intended to show various embodiments of the invention only and are not intended to limit the scope of the invention. All of the volume percentages listed are considered approximate.

EXAMPLE I

High Solids System (Two Part)

| COMPONENT | TRADE NAME | VOLUME % |
|---|---|---|
| PART A | | |
| Polyamide Resin | | 39.00 |
| Xylene | | 15.00 |
| Polyaniline Powder | Versicon | 7.00 |
| Ethyl Benzene | | 5.00 |
| Stoddard Solvent | | 5.00 |
| 1,2,4-Trimethylbenzene | | 2.00 |
| n-butyl alcohol | | 10.00 |
| Aluminum powder | AL-120 | 12.00 |
| Ethyl toluenesulfonamide | Uniplex 108 | 5.00 |
| | | 100% Part A |
| PART B | | |
| Epon resin | | 65.00 |
| Epoxy resin | | 13.00 |
| Xylene | | 22.00 |
| | | 100% Part B |

Equal volume amounts of Parts A and B are mixed immediately prior to application to the substrate.

EXAMPLE II

High Solids System (One Part)

| COMPONENT | TRADE NAME | VOLUME % |
|---|---|---|
| Urethane Resin | | 51.00 |
| Phenolic Resin | | 5.00 |
| Polyaniline Powder | Versicon | 7.00 |
| Aluminum Powder | Al-120 | 12.00 |
| Ethyl toluenesulfonamide | Uniplex 108 | 5.00 |
| VM&P naptha | | 3.00 |
| Xylene | | 3.00 |
| Mineral Spirits | | 14.00 |

EXAMPLE III

UV-Radiation Cure System

| COMPONENT | TRADE NAME | VOLUME % |
|---|---|---|
| Aliphatic urethane diacrylate | Ebercryl 4883 | 18.00 |
| Isobornyl acrylate | SR 506 | 33.00 |
| Polyaniline powder | Versicon | 10.00 |
| Acrylate polyester oligomer | Ebecryl 450 | 15.00 |
| 2-hydroxy-2-methyl-1-phenyl-1-propanone | Darocur 1173 | 5.00 |
| Hydroxycyclohexyl phenylketone | Irgacure 184 | 0.50 |
| Metallic diacrylate | SR 9016 | 5.00 |
| Aluminum Powder | AL-120 | 8.50 |
| Ethyl toluenesulfonamide | Uniplex 108 | 5.00 |

EXAMPLE IV

Powder Coat System

| COMPONENT | TRADE NAME | VOLUME % |
|---|---|---|
| Low density polyethylene | NA204 | 71.5 |
| Polyaniline powder | Versicon | 16.00 |
| Ethyl toluenesulfonamide | Uniplex 108 | 2.5 |
| Aluminum Powder | AL-120 | 10.00 |

The cured resin or binder, holds the aluminum or other anodic metal tightly in position to form the coating which adheres in electrical contact to the surface of the substrate. The polyaniline, or other inherently conductive polymer, that is dispersed into the resin base creates a conductive binder that promotes the galvanic action between the sacrificial metal anodes in the coating and the cathode surface.

The conductive binder acts as a conductor rather than a dielectric as is the case with other sacrificial organic coatings, thus allowing electrons to flow freely between anodic particles and cathode substrate.

The claimed improvements in corrosion resistance by use of the coating systems according to the invention are validated through markedly improved protection of the substrate when subjected to the salt spray test. Coated panels were intentionally scribed and tested in accordance with the procedure outlined in ASTM B 117-95. The panels exhibited only slight surface oxidation at the damaged areas after 800+ hours in a salt spray chamber.

The ASTM B117 salt spray test utilized to test the corrosion resistance of this cathodic coating system comprises a salt fog chamber. The chamber is comprised of a fog chamber, salt solution reservoir, conditioned compressed air line, fog nozzle, specimen support racks, heater, and controller. The specimens are supported in racks at an attitude between 15 and 30 degrees from vertical parallel to the principal direction of horizontal flow of fog through the chamber. The salt solution is mixed at 5%+/-1% salt by weight with water meeting the requirements of ASTM 1193-91, Type III. The pH of the condensed fog is maintained between 6.5 and 7.2. Temperature in the chamber is maintained at 95° F., +2° or −3°. Relative humidity in the chamber is maintained at 95% to 98%.

The test specimens consist of standard 3×5 inch Q-panels, manufactured from cold rolled 1010 steel. The panels are coated utilizing the method described. The substrate is then intentionally scribed to base metal in an "X" pattern. The partially exposed base metal allows evaluation of the cathodic properties of the coating versus its performance as strictly an electrolytic barrier.

The test results indicate utilization of this coating method will extend the service life of metals.

The invention has been described with reference to preferred embodiment. Obviously, modifications and alterations will occur to others upon a reading and understanding of this specification. It is intended to include all such modifications and alternations in so far as they come within the scope of the appended claims or the equivalence thereof.

Having thus described the invention, it is now claimed:

1. A coating composition for use in protecting a metallic substrate from corrosion, said coating composition comprising:
   a resin base;
   an inherently conductive polymer;

a metal anodic to said metallic substrate, said metal being in a form of finely divided particles and said metal is selected from the group consisting of a metal, a metal alloy or mixtures thereof; and, a curing agent;

wherein said conductive polymer, said metal particles and said curing agent are dispersed in said resin base.

2. The coating composition of claim 1 wherein said inherently conductive polymer is at least one member of the group consisting of polyaniline, polypyrrole, polythiopene, polyacetylene, poly (p-phenylene), poly (p-phenylene vinylene), poly (p-phenylene sulfide) and polyaniline substituted with alkyl, aryl, hydroxy, alkoxy, chloro, bromo, or nitro groups.

3. The coating composition of claim 1 wherein said metal is at least one member of the group consisting of aluminum, cadmium, magnesium, zinc, aluminum alloys, cadmium alloys, magnesium alloys and zinc alloys.

4. The coating composition of claim 1 wherein said resin base is at least one member of the group consisting of polyurethanes, epoxies, neutral resins, acidic resins, acrylates, polyesters, and glycidyl acrylates.

5. The coating composition of claim 1 wherein said curing agent is at least one member of the group consisting of sulfonamide, anhydride types, free radical photoinitiators, and cationic photoinitiators.

6. The coating composition of claim 2 wherein said at least one inherently conductive polymer comprises between 1% and 20% by volume of said coating composition.

7. The coating composition of claim 3 wherein said metal comprises between 5% and 20% by volume of said coating composition.

8. The coating composition of claim 3 wherein said metal exhibits a sufficient volt potential difference from said metallic substrate to form a cathodic coating.

9. The coating composition of claim 1 wherein said coating composition comprises a high solids formulation.

10. The coating composition of claim 1 wherein said coating composition comprises a UV radiation curable formulation.

11. The coating composition of claim 1 wherein said coating composition comprises a powder coating formulation.

12. A method of protecting a metallic substrate from corrosion including the steps of:

preparing a coating composition comprising a resin base, an inherently conductive polymer, a metal anodic to said metallic substrate, said metal being in a form of finely divided particles and said metal is selected from the group consisting of a metal, a metal alloy or mixtures thereof, and a curing agent, wherein said conductive polymer, said metal particles and said curing agent are dispersed in said resin base;

preparing a surface of said metallic substrate for adhesion to said coating composition;

coating said prepared surface with said coating composition; and, curing said coating composition to form a corrosion resistant coating on said prepared surface.

13. The method of claim 12 wherein said step of preparing said coating composition includes the steps of:

adding said inherently conductive polymer to said resin base;

mixing said conductive polymer and said resin base at a process temperature of from approximately 70° F. to 150° F. for sufficient time to thoroughly disperse said inherently conductive polymer;

adding said curing agent to said resin base;

adding said metal particles to said resin base; and, mixing said metal particles and said resin base for sufficient time to thoroughly disperse said metal particles.

14. The method of claim 12 wherein said step of curing said coating composition comprises:

allowing said coated substrate to stand at room temperature for between 24 and 72 hours.

15. The method of claim 12 wherein said step of curing said coating composition comprises:

placing said coated substrate in a thermal oven at 150° F. for between 1 and 4 hours.

16. The method of claim 12 wherein said curing agent is a photoinitiator and wherein said step of curing said coating composition comprises:

exposing said coated substrate to a radiation source.

17. The method of claim 12 wherein said step of curing said coating composition comprises:

placing said coated substrate is a thermal oven at a temperature below 400° F. for between 10 minutes and 30 minutes.

18. The method of claim 12 wherein said resin base and said inherently conductive polymer are in a form of powders and wherein said step of preparing said coating composition includes the steps of:

preparing a premix by dry blending said powdered resin base, said conductive polymer, said curing agent, and said metal particles until thoroughly mixed;

melt compounding said premix at a process temperature above a melting point of said resin base and below 400° F. for sufficient time to thoroughly disperse said conductive polymer and said metal particles in said molten resin base;

cooling and flattening said melt to form a compounded sheet;

primary grinding said compounded sheet to form chips; and, fine grinding said chips in a cryogenic mixing vessel to a desired particle size.

19. A method of preparing a coating composition for protection of a metallic substrate from corrosion, the method including the steps of:

adding an inherently conductive polymer to a resin base;

mixing said conductive polymer and said resin base at a process temperature of from approximately 70° F. to 150° F. for sufficient time to thoroughly disperse said inherently conductive polymer;

adding a curing agent to said resin base;

adding a metal anodic to said metallic substrate, said metal being in a form of finely divided particles to said resin base and said metal is selected from the group consisting of a metal, a metal alloy or mixtures thereof; and, mixing said metal particles and said resin base for sufficient time to thoroughly disperse said metal particles.

20. A method of preparing a coating composition for protection of a metallic substrate comprising the steps of:

preparing a premix by dry blending a powdered resin base, an inherently conductive polymer, a curing agent, and a metal anodic to said metallic substrate, said metal being in a form of finely divided particles until thoroughly mixed and said metal is selected from the group consisting of a metal, a metal alloy or mixtures thereof;

melt compounding said premix at a process temperature above a melting point of said resin base and below 400° F. for sufficient time to thoroughly disperse said conductive polymer and said metal particles in said molten resin base;

cooling and flattening said melt to form a compounded sheet;

primary grinding said compounded sheet to form chips; and, fine grinding said chips in a cryogenic mixing vessel to a desired particle size.

* * * * *

UNITED STATES PATENT AND TRADEMARK OFFICE
CERTIFICATE OF CORRECTION

PATENT NO.    : 5,976,419
DATED         : November 2, 1999
INVENTOR(S)   : Hawkins; Todd R. (Massillon, OH); Geer; Steven R. (Tallmadge, OH)

It is certified that error appears in the above-identified patent and that said Letters Patent is hereby corrected as shown below:

Inventors,
"Hawkins; Todd R. (Massillon, OH); Geer; Steven R. (Tallmadge, OH)" should read -- Hawkins; Todd R. (Massillon, OH) ); Geer; Steven K. (Tallmadge, OH) --.

Signed and Sealed this

Twenty-fifth Day of December, 2001

Attest:

JAMES E. ROGAN
Attesting Officer    Director of the United States Patent and Trademark Office